United States Patent
Benco et al.

(10) Patent No.: US 7,127,240 B2
(45) Date of Patent: Oct. 24, 2006

(54) METHOD FOR SELECTIVE MID-CALL CALL FORWARDING FROM MOBILE STATION

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 302 days.

(21) Appl. No.: 10/633,748

(22) Filed: Aug. 4, 2003

(65) Prior Publication Data

US 2005/0032509 A1 Feb. 10, 2005

(51) Int. Cl.
H04M 3/40 (2006.01)
(52) U.S. Cl. .................. 455/417; 455/445; 455/414.1; 370/352; 370/395.52; 379/88.17; 379/88.22
(58) Field of Classification Search ................ 455/417, 455/445, 414.1; 379/211.01, 211.02, 88.17, 379/88.22; 370/522, 401, 352, 395.52
See application file for complete search history.

(56) References Cited

U.S. PATENT DOCUMENTS

| | | | |
|---|---|---|---|
| 5,583,564 A | 12/1996 | Rao et al. | |
| 6,125,126 A * | 9/2000 | Hallenst.ang.l | 370/522 |
| 6,151,503 A | 11/2000 | Chavez | |
| 6,571,094 B1 * | 5/2003 | Begeja et al. | 455/417 |
| 2002/0052968 A1 * | 5/2002 | Bonefas et al. | 709/231 |
| 2002/0077091 A1 * | 6/2002 | Immonen et al. | 455/417 |
| 2002/0126827 A1 * | 9/2002 | Pelletier et al. | 379/230 |
| 2003/0054810 A1 * | 3/2003 | Chen et al. | 455/422 |
| 2003/0112930 A1 * | 6/2003 | Bosik et al. | 379/88.17 |
| 2003/0181202 A1 * | 9/2003 | Link et al. | 455/417 |
| 2004/0096047 A1 * | 5/2004 | Mailk et al. | 379/221.08 |
| 2004/0198361 A1 * | 10/2004 | Amin | 455/445 |
| 2004/0248591 A1 * | 12/2004 | Fish | 455/456.3 |

* cited by examiner

Primary Examiner—Danh Cono Le

(57) ABSTRACT

A method for providing selective mid-call call forwarding from a mobile station associated with a subscriber to a wireless service provider is provided. In one embodiment, the method includes: a) receiving an incoming call, b) ringing the mobile station, c) receiving a mid-call call forwarding activation from the mobile station, d) retrieving a telephone number associated with the mid-call call forwarding activation from a service plan associated with the subscriber, and e) forwarding the incoming call to a telephone device associated with the retrieved telephone number. In another embodiment, the mid-call call forwarding activation is a control signal resulting from a user pressing at least one key on the mobile station. In other aspects, a method of adding and/or modifying a selective mid-call call forwarding feature to a service plan associated with the subscriber is provided.

19 Claims, 3 Drawing Sheets

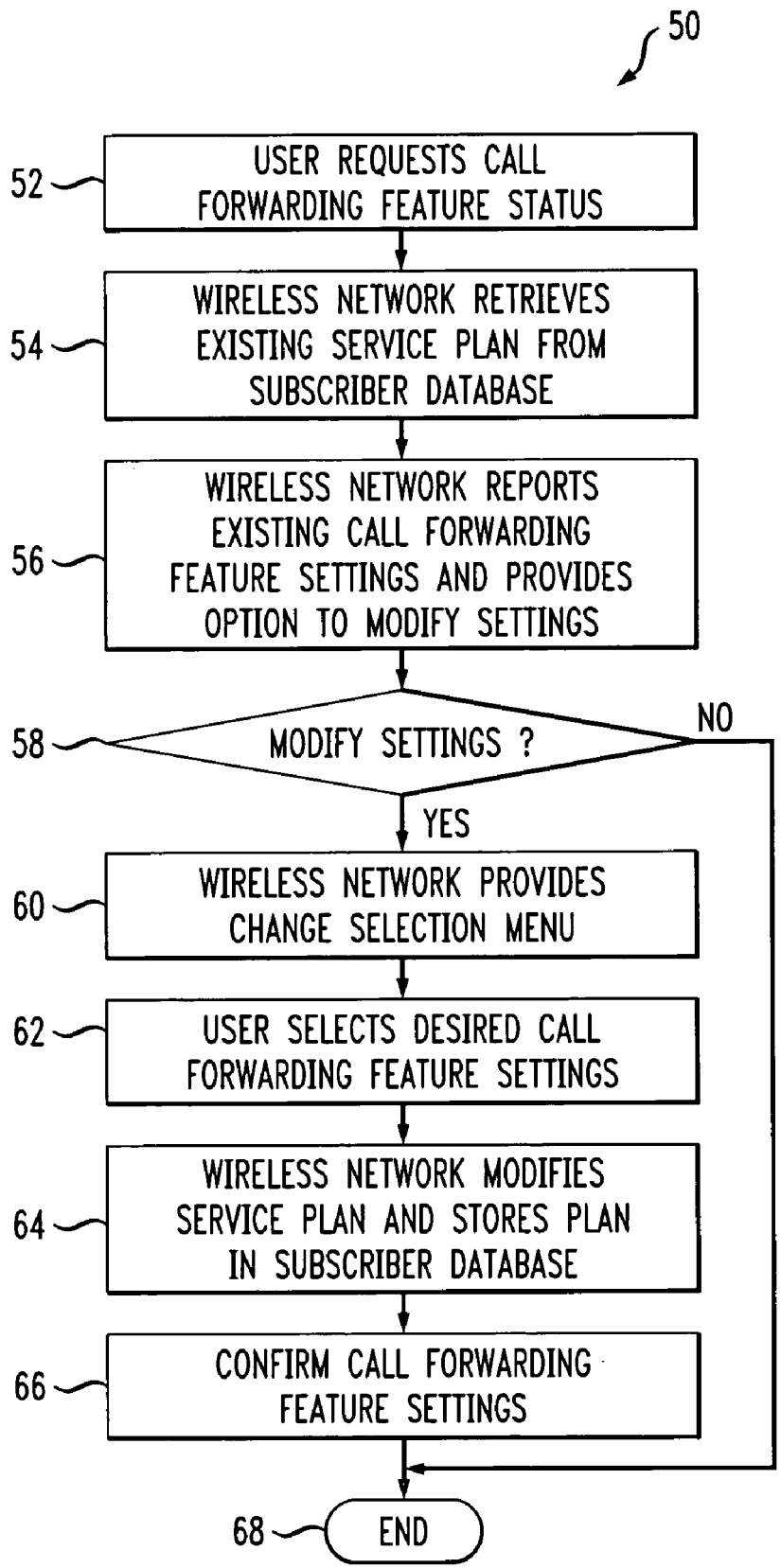

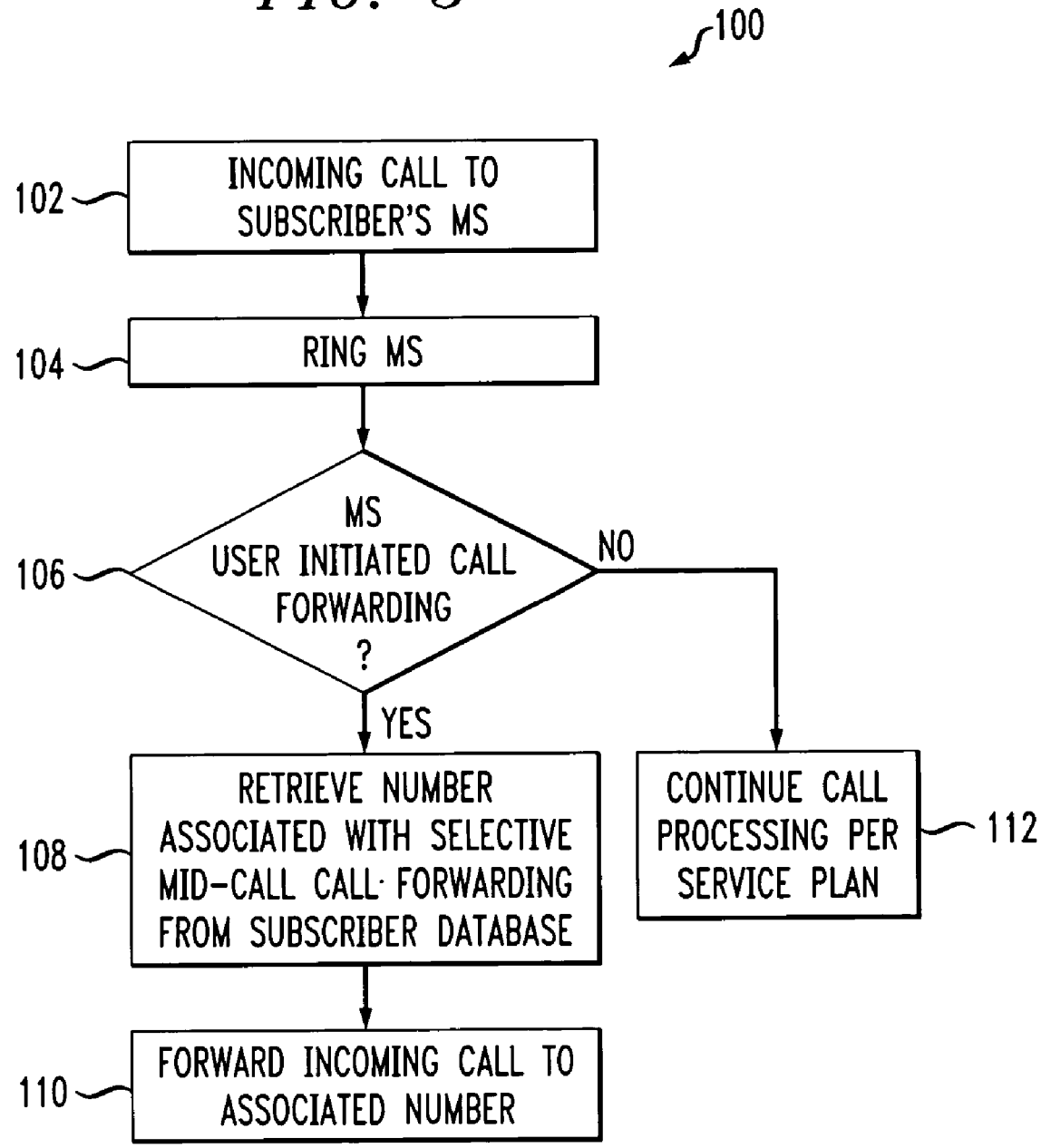

METHOD FOR SELECTIVE MID-CALL CALL FORWARDING FROM MOBILE STATION

BACKGROUND OF INVENTION

The invention generally relates to selective mid-call call forwarding and, more particularly, to a method for providing selective mid-call call forwarding from a mobile station (MS) associated with a subscriber to a wireless service provider and will be described with particular reference thereto. However, it is to be appreciated that the invention is also amenable to other applications. For example, providing selective mid-call call forwarding from any type of telephone device.

Call forwarding services for non-wireless and wireless telephone subscribers are known. However, none of the current call forwarding services allow an MS (or other type of telephone device) user to selectively initiate call forwarding for an incoming call in the middle of call processing (e.g., while the called telephone device is ringing). For example, several commonly-assigned patents identified below disclose call forwarding services for wireless telephone subscribers.

U.S. Pat. No. 5,583,564 to Rao et al. and assigned to Lucent Technologies, herein incorporated by reference, discloses intelligent call forwarding in an intelligent network. The intelligent network includes a Service Switching Point (SSP), a Service Control Point (SCP), and a Service Management System (SMS). A call to a network subscriber is routed to the SSP which is used to detect Call Forwarding "triggers"—conditions which require the SSP to initiate selective Call Forwarding service. When a Call Forwarding trigger is detected, the SSP passes the calling party's number to the SCP and requests call handling instructions from the SCP. The SCP provides the call handling instructions, as provisioned by the subscriber, to the SSP, and the SSP then forwards the call in accordance with the instructions. The SMS formulates and sends commands to the SCP for such purposes as changing the stored subscriber instructions or updating service features. By provisioning the SCP with appropriate instructions the forwarding destination for a call may be made to depend upon the time of day, day of the week, caller's identity, and/or status of the called telephone.

U.S. Pat. No. 6,151,503 to Chavez and assigned to Lucent Technologies discloses a subscriber activated wireless telephone call rerouting system that enables the subscriber to reroute incoming calls to an alternate destination that is off network. This service can be activated from either the subscriber's wireless telephone or from any other telephone that is part of the wireless telephone network or the non-wireless public switched telephone network and can be deactivated by the subscriber simply initiating a call from their wireless telephone. The alternate destination selected by the subscriber can be any telephone that is part of the wireless telephone network or the non-wireless public switched telephone network, either a local calling area number or a long distance number.

A user of an MS (or other type of telephone device) may prefer to answer certain calls while forwarding other calls to another telephone number. By using, for example, caller ID information, the user can distinguish between calls he/she wants to answer and calls he/she wants to forward. As a practical example, when a subscriber is attending a meeting, rather than having all calls forwarded, the subscriber may like to selectively screen calls so that he/she may answer calls from one particularly important person, while selectively forwarding other calls to another telephone number. Depending on the circumstances, a subscriber may also like to take unexpected calls from certain individuals, while selectively forwarding other calls to another telephone number. Current call forwarding services do not provide for such types of selective call forwarding.

Thus, there is motivation for a selective mid-call call forwarding feature from a mobile station.

BRIEF SUMMARY OF INVENTION

In one aspect of the invention, a method of adding a selective mid-call call forwarding feature to a service plan for a mobile station is provided. The method includes: a) receiving a request to add the selective mid-call call forwarding feature to the service plan from a user, wherein the request is initiated by the user via the mobile station, b) retrieving the service plan from a subscriber database, c) providing a change selection menu to the user in response to the request, d) modifying the service plan in conjunction with one or more user selections associated with the change selection menu, and e) storing the modified service plan in the subscriber database.

In another aspect of the invention, a method for modifying a selective mid-call call forwarding feature in a service plan for a mobile station is provided. The method includes: a) receiving a request for status of the selective mid-call call forwarding feature, wherein the request is initiated by the user via the mobile station, b) retrieving the service plan from a subscriber database, c) reporting the status of the selective mid-call call forwarding feature in the service plan to the user in response to the status request, d) receiving a request to modify the selective mid-call call forwarding feature from the user via the mobile station, e) providing a change selection menu to the user in response to the modification request, f) modifying the selective mid-call call forwarding feature in the service plan in conjunction with one or more user selections associated with the change selection menu, and g) storing the service plan with the modified selective mid-call call forwarding feature in the subscriber database.

In still another aspect of the invention, a method for processing an incoming call to a first mobile station associated with a subscriber to a wireless service provider is provided. The method includes: a) receiving the incoming call, b) ringing the first mobile station, c) receiving a mid-call call forwarding activation from the first mobile station, d) retrieving a telephone number associated with the mid-call call forwarding activation from a service plan associated with the subscriber, and e) forwarding the incoming call to a telephone device associated with the retrieved telephone number.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

FIG. 2 is a flowchart of an embodiment of a process allowing a user to modify a selective mid-call call forwarding feature in a service plan between a mobile subscriber and a wireless service provider.

FIG. 3 is a flowchart of an embodiment of a method for processing a call to a mobile station associated with a subscriber having a service plan with a selective mid-call call forwarding feature.

DETAILED DESCRIPTION

Figure 1:
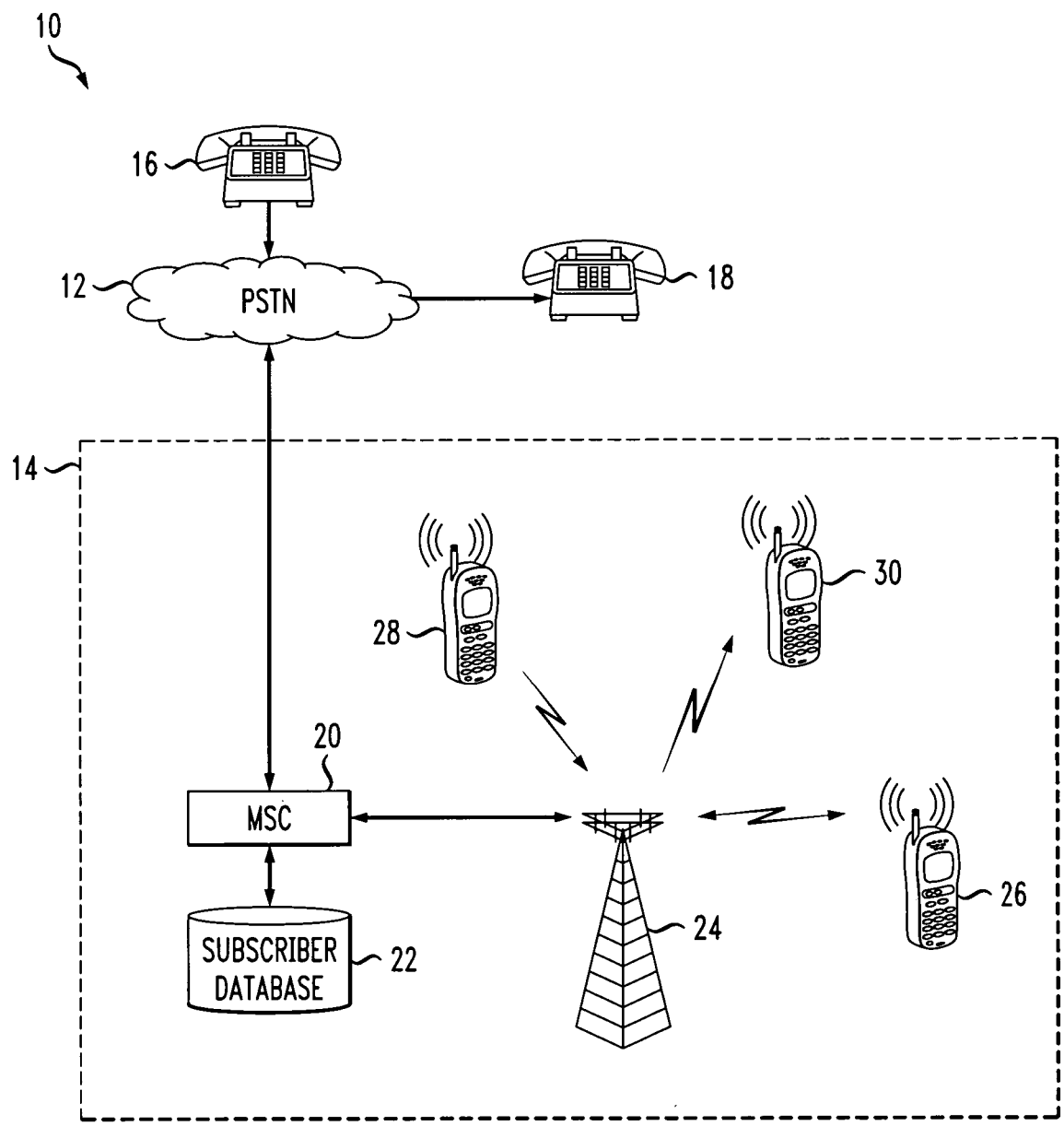
FIG. 1 is a block diagram of an embodiment of a telecommunication system incorporating at least one aspect of the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

With reference to FIG. 1, a telecommunication system 10 incorporating at least one aspect of the invention includes a public switched telephone network (PSTN) 12 and a wireless network 14. Among other equipment and devices, the PSTN 12 may include a first telephone device 16 and a second telephone device 18. The first and second telephone devices 16, 18 are provided for exemplary scenarios associated with the invention. In actuality, these telephone devices are interchangeable and represent any type of telephone device, including non-wireless or landline telephone devices and mobile stations (MSs) associated with other wireless networks. More or less telephone devices may be associated with actual scenarios associated with the invention.

The wireless network 14 includes at least one mobile switching center (MSC) 20, at least one subscriber database 22, at least one base station (BS) 24, and at least a first MS 26. In order to describe various scenarios associated with the invention, the wireless network 14 is shown with a second MS 28 and a third MS 30. In actuality, these MSs are interchangeable and represent any type of MS. More or less MSs may be associated with actual scenarios associated with the invention.

The subscriber database 22 stores a plurality of services plans, including a service plan for a mobile subscriber associated with a wireless service provider providing service via the wireless network 14. The mobile subscriber and the service plan are associated with the first MS 26. The service plan includes a selective mid-call call forwarding feature and various parameters associated therewith.

The wireless network 14 includes processes that allow a user to modify the selective mid-call call forwarding feature of the subscriber's service plan with the wireless service provider using the first MS 26, including initially adding the feature to the service plan. Preferably, the processes are implemented in the MSC 20, although the processes may, alternatively or in combination, be implemented in one or more peripheral devices and/or auxiliary components associated with the MSC. The processes are automated within the wireless network 14 and interact with the user via the first MS 26. The interactivity of the process may be either based on interactive audio, interactive graphics (e.g., text, symbols, images, etc.), or combinations of both.

In one embodiment, the process allows the user to add the selective mid-call call forwarding feature to the service plan stored in the subscriber database 22. For example, the existing service plan is modified by adding the selective mid-call call forwarding feature. The modified service plan is stored in the subscriber database 22. The modified service plan is effective until subsequent changes are made or until it expires on its own terms.

In another embodiment, the process allows the user to modify an existing selective mid-call call forwarding feature in a service plan. For example, the selective mid-call call forwarding feature is modified by changing a key that initiates selective call forwarding. The telephone number to which a call is forwarded may also be changed. Again, the modified service plan is stored in the subscriber database 22. The modified service plan is effective until subsequent changes are made or until it expires on its own terms.

For example, when the selective mid-call call forwarding feature is added to the service plan a key (e.g., a special function key or a selected keypad key) is identified to initiate call forwarding and a telephone number to which the call is to be forwarded is specified. Later, the key can be changed or the number can be changed. Additionally, in one embodiment, a second key and an associated second telephone number can be identified. In still another embodiment, a third key and an associated third telephone number can be identified. Additional keys and associated telephone numbers may also be implemented. Moreover, a single key or a sequence of keys can be setup to initiate selective mid-call call forwarding.

When an incoming call, for example, from the first telephone device 16 is received by the wireless network 14, the wireless network 14 rings the first MS 26. A user at the first MS 26 can elect to forward the call while the MS is ringing by using one of the keys identified for selective mid-call call forwarding. Typically, the user will view caller ID information on a display associated with the first MS 26 in order to determine whether or not to initiate call forwarding and, if the call can be forwarded to multiple telephone numbers, which telephone number to select for forwarding. Once the user decides to forward the call, he/she presses one of the keys setup for mid-call call forwarding. Then, the wireless network 14 receives the key activation, for example, via the reverse traffic channel or the access channel and retrieves the telephone number associated with the mid-call call forwarding key in the subscriber's service plan stored in the subscriber database. The associated telephone number may, for example, be associated with the second telephone device 18. Next, the call is forwarded to the associated telephone number by ringing the second telephone device 18.

In another example, the incoming call may be from the second MS 28 and the mid-call call forwarding key may be associated with a telephone number for the third MS 30. Of course, other exemplary scenarios are also possible.

With reference to FIG. 2, an embodiment of a process 50 allowing a user to modify a selective mid-call call forwarding feature in a service plan between a mobile subscriber and a wireless service provider begins at step 52 when the user requests selective mid-call call forwarding feature status from the wireless network. This is typically accomplished by dialing a predetermined sequence of digits from an MS associated with the mobile subscriber/service plan.

At step 54, in response to the status request, the wireless network retrieves the existing service plan associated with the subscriber from a subscriber database. Next, the wireless network reports the existing selective mid-call call forwarding feature status to the user and provides the user with an option to modify the current settings (step 56). The status and modification option may be provided via audio or graphics (e.g., text, symbols, images, etc.) to the telephone device.

The user may request to modify the selective mid-call call forwarding feature settings, for example, by selectively speaking a predetermined word or by pressing a predetermined key. At step 58, the wireless network determines if the user has requested to modify the settings. If the user has requested to modify the settings, the wireless network receives the request. At this point (or at an earlier point), the wireless network may verify that the user has authority associated with the subscriber to modify the selective mid-call call forwarding feature settings.

Next, at step 60, the wireless network provides a change selection menu to the user in response to the modification request. The change selection menu may include an interactive audio portion, an interactive graphical display, or a combination of both audio and graphics (e.g., text, symbols, images, etc.). The change selection menu may allow the user to, for example, identify a particular key or sequence of keys with which to initiate the call forwarding feature during a subsequent incoming call and specify a telephone number to which the call will be forwarded. A second key or key sequence along with a second telephone number can be specified in embodiments that support multiple choices for call forwarding. Likewise, a third key or key sequence and a third telephone number can be specified. Of course, additional key/key sequences and corresponding telephone numbers can be specified. At step 62, the user selects desired selective mid-call call forwarding feature settings (e.g., key/key sequences and associated telephone numbers) associated with the change selection menu, for example, by selectively speaking a predetermined word or by pressing a predetermined key.

Next, at step 64, the wireless network modifies the selective mid-call call forwarding feature settings and the associated service plan in conjunction with the user selections associated with the change selection menu and stores the modified service plan in the subscriber database. Prior to storing the modified service plan, the wireless network may provide the user with a selective mid-call call forwarding feature status in order to confirm that the changes about to be made are acceptable to the user. At step 66, the wireless network confirms that the modified service plan with the modified selective mid-call call forwarding feature settings was properly stored in the subscriber database. At this point, the process has reached its end (step 68).

At step 58, if the user did not request to modify the selective mid-call call forwarding feature settings, the process has reached its end (step 68).

An example of an interactive audio sequence between the user and the wireless network during setup of the selective mid-call call forwarding feature is as follows:

"Mary True, you currently have two one-key number forwarding. Press 1 if you would like to hear your current one-key forwarding information. Press 2 if your would like to update your existing one-key call forwarding information for the first number. Press 3 if you would like to update your existing one-key call forwarding information for the second number."

In response, for example, the user presses "2." Next, the wireless network provides the following exemplary message:

"Press 1 if you would like to update an existing one-key forwarding entry. Press 2 if you would like to add a one-key call forwarding entry. Press 3 if you would like to delete a one-key call forwarding entry."

In response, for example, the user presses "2." Next, the wireless network provides the following exemplary message:

"Please press the key that you would like to use for the new one-key call forwarding entry."

In response, for example, the user presses "3." Next, the wireless network providers the following exemplary message:

"Please enter the telephone number to which a call is to be forwarded."

In response, for example, the user presses "123-4567." Next, the wireless network providers the following exemplary message:

"You entered telephone number 123-4567 for mid-call call forwarding when the key 3 is pressed on your MS. Please press 1 to confirm the selection or 2 to change the selection."

In response, for example, the user presses "1." Next, the wireless network providers the following exemplary message:

"Thank you, the new one-key call forwarding entry has been saved."

An example of an interactive audio confirmation sequence between the user and the wireless network includes the following information:

"Mary True, your request to update your Service Plan from the Regional Calling Plan to the Nationwide Calling Plan has been accepted. This new plan will expire on Jan. 1, 2004, at which time you will return to your default plan which is the "Regional Calling Plan.""

An example of an interactive graphical display sequence between the user and the wireless network includes the following information:

"Regional Calling Plan Active Until Jan. 1, 2004.
Choose one of the following options:
1. Activate Nationwide Calling Plan for $39.99/month.
2. Activate Worldwide Calling Plan for $99/month.
3. Retain Current Calling Plan.
Enter Expiration Date (MMDDYYYY) for Calling Plan: MMDDYYYY"

In response, for example, the user selects "1" for the Nationwide Calling Plan and enters "01012004" to complete the date field.

An example of an interactive graphical display confirmation sequence between the user and the wireless network includes the following information:

"Service Plan Change Request Completed.
Nationwide Calling Plan now in effect until Jan. 1, 2004."

With reference to FIG. 3, a method 100 for processing a call to an MS associated with a subscriber having a service plan with a selective mid-call call forwarding feature begins at step 102 when the wireless network receives an incoming call to the MS. Next, at step 104, the wireless network rings the MS. This method presumes that selective mid-call call forwarding has been set up as described above in reference to FIG. 2. If a user associated with the MS desires to forward the call, the user presses a predetermined key or key sequence associated with a predetermined telephone number to which the user wishes to forward the call to initiate call forwarding. At step 106, the wireless network determines if the user has initiated call forwarding for the incoming call.

If the user has initiated call forwarding, the wireless network retrieves the telephone number associated with the key/key sequence selected by the user from the service plan stored in the subscriber database (step 108). Next, at step 110, the wireless network forwards the incoming call to the retrieved telephone number.

At step 106, if the user has not initiated call forwarding, the wireless network continues to process the call according to the subscriber's service plan (step 112).

In summary, one aspect of the invention provides a wireless network that supports MS users by immediately forwarding an incoming call to a predefined telephone number when the MS user presses at least one key on the MS. This allows a user that cannot answer the incoming call, for example, due to a meeting with an option to forward the call to their secretary. Alternatively, the user may want to forward the call to a different location depending on the caller. In general, the MS send a message or control signal to the wireless network and the wireless network immediately forwards the call to the predefined phone number. Previously, the telephone number to which the call is forwarded is programmed by the user and saved in the wireless network. This is different from previous types of call forwarding features because the user can selectively choose to forward an individual call and, in one embodiment, select between multiple call forwarding destinations.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof

We claim:

1. A method of adding a selective mid-call call forwarding feature to a service plan for a mobile station, the method including the steps:
   a) receiving a request to add the selective mid-call call forwarding feature to the service plan from a user, wherein the request is initiated by the user via the mobile station;
   b) retrieving the service plan from a subscriber database;
   c) providing a change selection menu to the user in response to the request;
   d) modifying the service plan in conjunction with one or more user selections associated with the change selection menu; and
   e) storing the modified service plan in the subscriber database.

2. The method as set forth in claim 1, further including: verifying the user has authority associated with the subscriber to add the selective mid-call call forwarding feature to the service plan.

3. The method as set forth in claim 1 wherein the change selection menu provided to the user includes a portion for selection of a first key on the mobile station to activate the selective mid-call call forwarding feature and forward an incoming call to a first telephone number.

4. The method as set forth in claim 3 wherein the change selection menu provided to the user includes a portion for specifying the first telephone number.

5. The method as set forth in claim 3 wherein the change selection menu provided to the user includes a portion for selection of a second key on the mobile station to activate the selective mid-call call forwarding feature and forward an incoming call to a second telephone number.

6. The method as set forth in claim 5 wherein the change selection menu provided to the user includes a portion for specifying the second telephone number.

7. The method as set forth in claim 5 wherein the change selection menu provided to the user includes a portion for selection of a third key on the mobile station to activate the selective mid-call call forwarding feature and forward an incoming call to a third telephone number.

8. The method as set forth in claim 7 wherein the change selection menu provided to the user includes a portion for specifying the third telephone number.

9. The method as set forth in claim 7 wherein the change selection menu provided to the user includes an interactive audio portion.

10. The method as set forth in claim 7 wherein the change selection menu provided to the user includes an interactive graphical display portion.

11. A method for modifying a selective mid-call call forwarding feature in a service plan for a mobile station, the method including the steps:
    a) receiving a request for status of the selective mid-call call forwarding feature, wherein the request is initiated by the user via the mobile station;
    b) retrieving the service plan from a subscriber database;
    c) reporting the status of the selective mid-call call forwarding feature in the service plan to the user in response to the status request;
    d) receiving a request to modify the selective mid-call call forwarding feature from the user via the mobile station;
    e) providing a change selection menu to the user in response to the modification request;
    f) modifying the selective mid-call call forwarding feature in the service plan in conjunction with one or more user selections associated with the change selection menu; and
    g) storing the service plan with the modified selective mid-call call forwarding feature in the subscriber database.

12. The method as set forth in claim 11, further including: verifying the user has authority associated with the subscriber to modify the selective mid-call call forwarding feature in the service plan.

13. The method as set forth in claim 11 wherein the change selection menu includes a portion for user selection of a key activation on the mobile station and user specification of a telephone number, where activation of the selected key prior to answering an incoming call causes the incoming call to be forwarded to the specified telephone number.

14. The method as set forth in claim 13 wherein the change selection menu provided to the user includes an interactive audio portion.

15. The method as set forth in claim 13 wherein the change selection menu provided to the user includes an interactive graphical display portion.

16. A method for processing an incoming call to a first mobile station associated with a subscriber to a wireless service provider, the method including the steps:
    a) receiving the incoming call;
    b) ringing the first mobile station;
    c) receiving a mid-call call forwarding activation from the first mobile station;

d) retrieving a telephone number associated with the mid-call call forwarding activation from a service plan associated with the subscriber; and e) forwarding the incoming call to a telephone device associated with the retrieved telephone number;

wherein the mid-call call forwarding activation is a control signal resulting from a user at the first mobile station pressing at least one key on the first mobile station.

17. The method as set forth in claim 16 wherein the telephone number in step d) is retrieved from a subscriber database.

18. The method as set forth in claim 16 wherein the telephone device in step e) is a second mobile station.

19. The method as set forth in claim 16 wherein the telephone device in step e) is a landline telephone device.

* * * * *